(12) United States Patent
Kim et al.

(10) Patent No.: US 11,198,445 B2
(45) Date of Patent: Dec. 14, 2021

(54) APPARATUS FOR CONTROLLING DRIVING ASSISTANCE OF VEHICLE, SYSTEM INCLUDING THE SAME AND METHOD FOR THE SAME

(71) Applicants: HYUNDAI MOTOR COMPANY, Seoul (KR); KIA MOTORS CORPORATION, Seoul (KR)

(72) Inventors: Jin Kwon Kim, Suwon-si (KR); Kyoung Jun Lee, Seoul (KR); Dong Gu Lee, Seoul (KR); Byoung Joon Lee, Suwon-si (KR); Sam Yong Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 219 days.

(21) Appl. No.: 16/437,157

(22) Filed: Jun. 11, 2019

(65) Prior Publication Data
US 2020/0156653 A1 May 21, 2020

(30) Foreign Application Priority Data
Nov. 16, 2018 (KR) ......................... 10-2018-0142005

(51) Int. Cl.
| | |
|---|---|
| *B60W 50/08* | (2020.01) |
| *B60W 30/16* | (2020.01) |
| *B60W 10/04* | (2006.01) |
| *B60W 10/20* | (2006.01) |
| *B60W 30/18* | (2012.01) |
| *B60W 50/10* | (2012.01) |

(52) U.S. Cl.
CPC .......... *B60W 50/085* (2013.01); *B60W 10/04* (2013.01); *B60W 10/20* (2013.01); *B60W 30/16* (2013.01); *B60W 30/18163* (2013.01); *B60W 50/10* (2013.01); *B60W 2540/10* (2013.01); *B60W 2540/18* (2013.01); *B60W 2556/00* (2020.02); *B60W 2720/106* (2013.01); *B60W 2754/30* (2020.02)

(58) Field of Classification Search
CPC .................................................. B60W 50/085
See application file for complete search history.

(56) References Cited

U.S. PATENT DOCUMENTS

| | | | |
|---|---|---|---|
| 9,180,890 B2 | 11/2015 | Lu | |
| 9,266,536 B2 | 2/2016 | Loria | |
| 2010/0023223 A1* | 1/2010 | Huang | B60W 40/09 701/44 |
| 2015/0239472 A1* | 8/2015 | Sudou | B60W 40/04 702/96 |
| 2016/0272217 A1* | 9/2016 | Kim | G06K 9/00255 |

(Continued)

*Primary Examiner* — Alex C Dunn
(74) *Attorney, Agent, or Firm* — McDonnell Boehnen Hulbert & Berghoff LLP

(57) ABSTRACT

An apparatus for controlling the driving assistance of a vehicle, a system including the same and a method for the same are provided. The apparatus for controlling the driving assistance of the vehicle includes a processor to adjust a driving assistance controlling setting value, based on at least one of whether a user looks ahead, whether the user performs a driving manipulation, and a driving condition during driving assistance of the vehicle, and a storage to store the driving assistance controlling setting value.

23 Claims, 6 Drawing Sheets

(56) References Cited

U.S. PATENT DOCUMENTS

| | | | | |
|---|---|---|---|---|
| 2017/0054842 | A1* | 2/2017 | Choi | H04W 4/40 |
| 2017/0072955 | A1* | 3/2017 | Ediger | B60W 30/16 |
| 2017/0267256 | A1* | 9/2017 | Minster | B60W 50/082 |
| 2017/0369073 | A1* | 12/2017 | Huber | B60W 30/08 |
| 2018/0059773 | A1* | 3/2018 | Park | G06F 3/038 |
| 2018/0134295 | A1* | 5/2018 | Gaither | B60W 50/06 |
| 2018/0154898 | A1* | 6/2018 | Wrobel | B60W 10/26 |
| 2018/0237011 | A1* | 8/2018 | Laurent | B60W 30/162 |
| 2019/0100209 | A1* | 4/2019 | Plianos | B60W 30/18127 |
| 2019/0147271 | A1* | 5/2019 | Tanaka | G06F 3/013 |
| | | | | 340/576 |
| 2019/0147274 | A1* | 5/2019 | Tanaka | B60W 40/09 |
| | | | | 701/36 |
| 2019/0375403 | A1* | 12/2019 | Hu | B60W 30/143 |
| 2020/0086873 | A1* | 3/2020 | Tahmasbi-Sarvestani | |
| | | | | G08G 1/16 |
| 2020/0223410 | A1* | 7/2020 | Ikezawa | B60T 8/17555 |

* cited by examiner

APPARATUS FOR CONTROLLING DRIVING ASSISTANCE OF VEHICLE, SYSTEM INCLUDING THE SAME AND METHOD FOR THE SAME

CROSS REFERENCE TO RELATED APPLICATION

This application is claims the benefit of priority to Korean Patent Application No. 10-2018-0142005, filed in the Korean Intellectual Property Office on Nov. 16, 2018, the entire contents of which are incorporated herein by reference.

TECHNICAL FIELD

The present disclosure relates to an apparatus for controlling driving assistance of a vehicle, a system including the same, and a method for the same, and more particularly to a technology of detecting the intent of a user and rapidly and intuitively changing the setting for controlling the driving assistance.

BACKGROUND

Currently, the setting of a driving assistance function has been changed through a button mounted on a steering wheel or a center console or through a user setting module (USM) of a cluster or an audio video navigation (AVN).

In the case of such a setting manner, it is difficult to reflect the preference of a user frequently changed depending on surrounding environments as the way to use the button and the USM become complex.

Conventionally, there has been developed a technology of changing settings for the driving assistance function based on an individual profile by managing an individual profile based on driving data, driving environment information, and the individual inclination. However, it takes a long time to generate the individual profile and to train the individual profile suitably for each individual. In addition, the above manner is made on the assumption that the inclination of the user is consistent. Accordingly, when a user wants the driving different from the driving at ordinary times, the individual profile conventionally trained may disturb desired driving. For example, under the situation that an easy-going user is pressed for time and has to rapidly drive, the conventional individual profile fails to reflect a current condition. Accordingly, to enhance the usability of the driving assistance function, there is required a manner of more rapidly and easily changing the settings than a manner of managing the individual profile.

SUMMARY

The present disclosure has been made to solve the above-mentioned problems occurring in the prior art while advantages achieved by the prior art are maintained intact.

An aspect of the present disclosure provides an apparatus for controlling driving assistance of a vehicle, a system including the same, and a method for the same, capable of changing or maintaining a driving assistance controlling setting value by detecting the intent of a user based on at least one of whether a user looks ahead, manipulates an acceleration pedal, manipulates a deceleration pedal, and performs steering.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving assistance for a vehicle may include a processor to adjust a driving assistance controlling setting value, based on at least one of whether a user looks ahead, whether the user performs a driving manipulation, and a driving condition during driving assistance of the vehicle, and a storage to store the driving assistance controlling setting value.

According to an embodiment, the processor may increase a distance between a host vehicle and a preceding vehicle, when the user does not look ahead for a preset time.

According to an embodiment, the driving manipulation may include at least one of whether an acceleration pedal is manipulated, whether a deceleration pedal is manipulated, whether a lane is changed, and whether steering is performed.

According to an embodiment, the driving condition may include at least one of whether a preceding vehicle is present, a difference in a target speed between the preceding vehicle and a host vehicle, and whether a surrounding vehicle is present.

According to an embodiment, the processor may determine whether a preceding vehicle is present, when the user looks ahead for a preset time and presses an acceleration pedal, and may increase a target speed of a host vehicle, when the preceding vehicle is absent.

According to an embodiment, the processor may compare a speed of the preceding vehicle and the target speed of the host vehicle, when the preceding vehicle is present and may increase the target speed of the host vehicle and reduce a target distance between the host vehicle and the preceding vehicle, when the speed of the preceding vehicle is faster than the target speed of the host vehicle.

According to an embodiment, the processor may compare a speed of the preceding vehicle and the target speed of the host vehicle, when the preceding vehicle is present, and may reduce a target distance between the host vehicle and the preceding vehicle, when the speed of the preceding vehicle is equal to or slower than the target speed of the host vehicle.

According to an embodiment, the processor may set a distance between a host vehicle and a preceding vehicle at a time point that the user reduces a pressing degree of a deceleration pedal, as a target distance between the host vehicle and the preceding vehicle, or may set a speed of the host vehicle at the time point that the user reduces the pressing degree of the acceleration pedal, as a target speed of the host vehicle, when the user looks ahead in a duration from a time point that the user presses an acceleration pedal to a time point that the user reduces a pressing degree of the acceleration pedal.

According to an embodiment, the processor may set a distance between a host vehicle and a preceding vehicle at a time point that the user takes a foot of the user off a deceleration pedal, as a target distance between the host vehicle and the preceding vehicle, or may set a speed of the host vehicle at the time point that the user takes the foot of the user off the deceleration pedal, as a target speed of the host vehicle, when the user presses the deceleration pedal immediately after starting pressing an acceleration pedal and taking the foot of the user off the acceleration pedal, and then takes the foot of the user off the deceleration pedal.

According to an embodiment, the processor may set a distance between a host vehicle and a preceding vehicle at a time point that the user takes the foot of the user off a deceleration pedal, as a target distance between the host vehicle and the preceding vehicle, or may set a speed of the host vehicle at a time point that the user takes the foot of the user off an acceleration pedal, as a target speed of the host vehicle, when a preceding vehicle, which is driving at a speed faster than the target speed of the host vehicle, is present, and when the user presses the deceleration pedal immediately after starting pressing the acceleration pedal and taking the foot of the user off the acceleration pedal, and then takes the foot of the user off the deceleration pedal.

According to an embodiment, the processor may determine whether a preceding vehicle is present, when the user looks ahead for a preset time and presses a deceleration pedal, and may decrease a target speed of a host vehicle, when the preceding vehicle is absent.

According to an embodiment, the processor may increase a target distance between the host vehicle and the preceding vehicle, when the preceding vehicle is present.

According to an embodiment, the processor may increase the target distance between the host vehicle and the preceding vehicle, when a longitudinal acceleration is a preset value or more in a state that the user presses the deceleration pedal for a preset time and when the user looks ahead for the preset time.

According to an embodiment, the processor may set a distance between a host vehicle and a preceding vehicle at a time point that the user reduces a pressing degree of a deceleration pedal, as a target distance between the host vehicle and the preceding vehicle, or may set a speed of the host vehicle at the time point that the user reduces the pressing degree of the deceleration pedal, as a target speed of the host vehicle, when the user looks ahead for the preset time in a duration from a time point that the user presses the deceleration pedal to the time point that the user reduces the pressing degree of the deceleration pedal.

According to an embodiment, the processor may set a distance between a host vehicle and a preceding vehicle at a time point that the user takes the foot of the user off an acceleration pedal, as a target distance between the host vehicle and the preceding vehicle, or may set a speed of the host vehicle at the time point that the user takes the foot of the user off the acceleration pedal, as a target speed of the host vehicle, when the user presses the acceleration pedal immediately after starting pressing a deceleration pedal and taking the foot of the user off the deceleration pedal, and then takes the foot of the user off the acceleration pedal.

According to an embodiment, the processor may determine whether a surrounding vehicle is present, when the user looks ahead for a preset time, changes a lane, or performs steering; and may control a host vehicle to perform bias driving while avoiding left and right vehicles when the surrounding vehicle is present.

According to an embodiment, the processor may determine whether a surrounding vehicle is present, when the user looks ahead for a preset time, changes a lane, or performs steering; and may control a driving position of a host vehicle within the lane when the surrounding vehicle is absent.

According to an embodiment, the processor may determine whether the user looks ahead until a time point that the steering is finished, when the steering is performed at a preset angle or more.

According to an embodiment, the processor may determine that the steering is finished, when a steering angle is maintained at the preset angle or less for a preset time, or when a steering angular velocity is maintained to a specific angular velocity or less for a preset time.

According to an embodiment, the processor may set a lateral position of a host vehicle within a lane at a time point that steering is finished, as a target lateral position of the host vehicle, when the user looks ahead for a preset time in a duration from a time point that driving lateral position adjustment is started within the lane to a time point that the steering is finished.

According to an embodiment, the processor may set a lateral position of the host vehicle at a time point that an opposition-directional steering is terminated, as the target position of the host vehicle, when the opposition-direction steering is performed after the steering is performed.

According to another aspect of the present disclosure, a vehicle system may include a vehicle driving controller to adjust a driving assistance controlling setting value, based on at least one of whether a user looks ahead, whether the user performs a driving manipulation, and a driving condition during driving assistance of a vehicle, and a sensing module to sense whether the user looks ahead and the driving condition and to provide a sensing result to the vehicle driving controller.

According to another aspect of the present disclosure, a method for controlling driving assistance for a vehicle, may include determining at least one of whether a user looks ahead, whether the user performs a driving manipulation, and a driving condition during driving assistance of the vehicle; and adjusting a driving assistance controlling setting value, based on the at least one of whether the user looks ahead, whether the user performs the driving manipulation, and the driving condition.

According to an embodiment, the driving manipulation may include at least one of whether an acceleration pedal is manipulated, whether a deceleration pedal is manipulated, whether a lane is changed, and whether steering is performed; and the driving condition may include at least one of whether a preceding vehicle is present, a difference in a target speed between the preceding vehicle and a host vehicle, and whether a surrounding vehicle is present.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
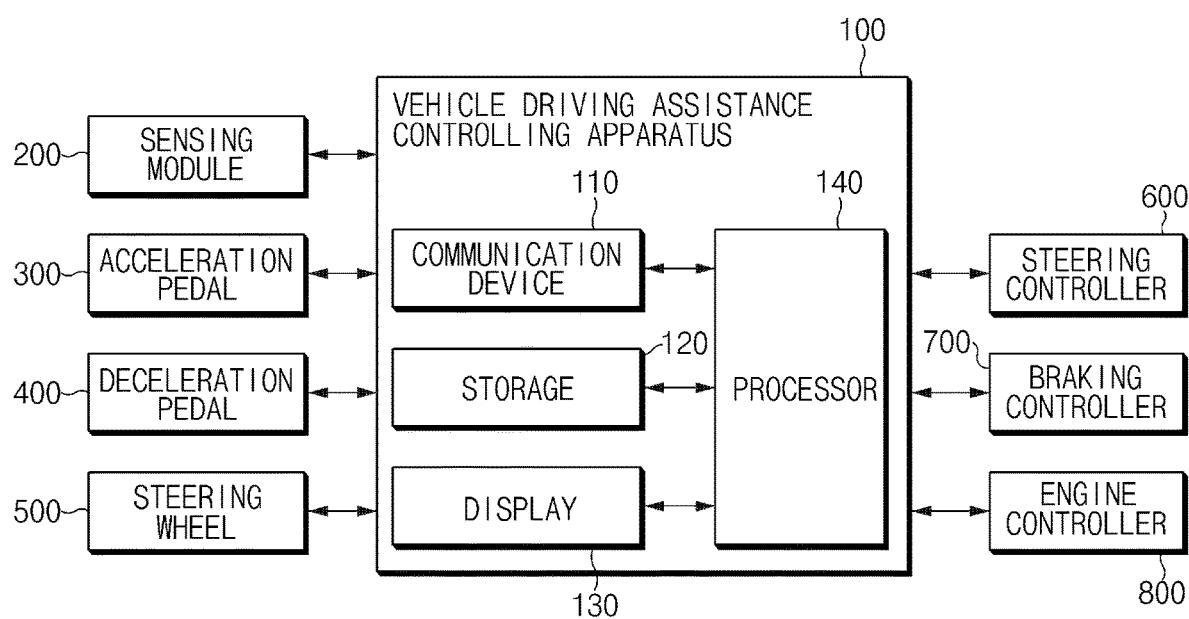
FIG. 1 is a block diagram illustrating the configuration of a vehicle system including an apparatus for controlling the driving assistance of a vehicle, according to an embodiment of the present disclosure.

Hereinafter, some embodiments of the present disclosure will be described in detail with reference to accompanying drawings. In the following description, the same reference numerals will be assigned to the same components even though the elements are illustrated in different drawings. In addition, in the following description, a detailed description of well-known features or functions will be ruled out in order not to unnecessarily obscure the gist of the present disclosure.

In describing elements of exemplary embodiments of the present disclosure, the terms 1st, 2nd, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technology in which, when a driving assistance controlling function is performed, it is determined whether the control of a user is intended, a user currently prefers the active control, or the control based on ride quality, and the setting value of the driving assistance controlling function of the vehicle, which is suitable for the determination, is changed and applied. According to the present disclosure, the setting of the driving assistance function of the vehicle may be intuitively and rapidly changed by determining whether a camera to monitor a user, and a deceleration pedal, an acceleration pedal, and a steering wheel, which are interfaces for longitudinal-direction control and lateral-direction control of the vehicle are manipulated. In this case, the driving assistance controlling function may include preceding vehicle following for longitudinal-direction control, speed control (smart cruise system (SCC)), lateral-direction control (lane keeping; Lane Keeping Assist System (LKA)), and a feature for rapidly and intuitively changing the setting for driving assistance control.

Hereinafter, embodiments of the present disclosure will be described in detail with reference to FIGS. 1 to 6.

FIG. 1 is a block diagram illustrating the configuration of a vehicle system including an apparatus for controlling the driving assistance of a vehicle (hereinafter, referred to as "vehicle driving assistance controlling apparatus"), according to an embodiment of the present disclosure.

Referring to FIG. 1, according to an embodiment of the present disclosure, the vehicle system may include a vehicle driving assistance controlling apparatus 100, a sensing module 200, an acceleration pedal 300, a deceleration pedal 400, a steering wheel 500, a steering controller 600, a braking controller 700, and an engine controller 800.

The vehicle driving assistance controlling apparatus 100 may change and maintain a setting value (hereinafter, referred to as "driving assistance controlling setting value") for the driving assistance controlling by detecting the intent of a user based on at least one of whether a user looks ahead, manipulates an acceleration pedal, manipulates a deceleration pedal, or performs steering.

The vehicle driving assistance controlling apparatus 100 may include a communication device 110, a storage 120, a display 130, and a processor 140.

The communication device 110 is a hardware device implemented with various electronic circuits to transmit and receive a signal through wireless or wired connection. According to the present disclosure, the communication device 110 may make in-vehicle communication through controller area network (CAN) communication or local interconnect network (LIN) communication and may communicate with the sensing module 200, the acceleration pedal 300, the deceleration pedal 400, the steering wheel 500, the steering controller 600, the braking controller 700, and the engine controller 800.

The storage 120 may store the sensing result of the sensing module 200 and a driving assistance controlling setting value set by the processor 140. The storage 120 may include at least one storage medium among a flash type memory, a hard disk type memory, a micro type memory, a card (e.g., a secure digital (SD) card, or an eXtream digital card) type memory, a random access memory (RAM), a Static Random Access Memory (SRAM), a Read Only Memory (ROM), a Programmable Read Only Memory (PROM), an Electrically Erasable and Programmable ROM (EEPROM), a magnetic RAM (MRAM), a magnetic disk type memory, and an optical disk type memory.

The display 130 may display information for changing or maintaining the setting value of the driving assistance controlling function such that the user recognizes the information. The display 130 may be implemented with a head up display 130 (HUD), a cluster, an AVN, or the like. In addition, the display 130 may directly receive a color input from a user through a user setting menu (USM) of the cluster. In addition, the display 130 may include at least one of a liquid crystal display (LCD), a thin film transistor-liquid crystal display (TFT LCD), a light emitting diode (LED), an organic light-emitting diode (OLED), an active matrix OLED (AMOLED), a flexible display, a bended display, and a third dimension display. Among them, some displays may be implemented with transparent displays configured in a transparent type or a light transparent type such that the displays are viewed from the outside. In addition, the display 130 is implemented with a touchscreen including a touch panel to be used as an input device in addition to an output device.

The processor 140 may be electrically connected with the communication device 110, the storage 120, the display 130, and the like, may electrically control each component, and may be an electric circuit that executes software commands. Accordingly, the processor 140 may perform various data processing and calculation, to be described below.

The processor 140 may adjust the driving assistance controlling setting value, based on at least one of whether a user looks ahead or performs driving manipulation, or a driving condition. In this case, the driving manipulation may include at least one of whether the deceleration pedal is manipulated, the acceleration pedal is manipulated, a lane is changed, and steering is performed. In addition, the driving condition may include at least one of whether a preceding vehicle is present, the difference in a target speed between the preceding vehicle and a host vehicle, and whether a surrounding vehicle is present.

The processor 140 may determine that a user wants ride quality first driving, when the user does not look ahead for a preset time, and may increase the target distance between the host vehicle and the preceding vehicle to obtain the ride quality.

The processor 140 may determine whether the preceding vehicle is present, when the user looks ahead for a preset time, and presses the acceleration pedal 300, and may increase a target speed of the host vehicle, when the preceding vehicle is absent.

The processor 140 may compare the speed of the preceding vehicle with the target speed of the host vehicle, when the preceding vehicle is present. When the speed of the preceding vehicle is faster than the target speed of the host vehicle, the processor 140 may determine that the user feels like that the current speed of the host vehicle is slow and the distance from the preceding vehicle is long, thereby increasing the target speed of the host vehicle and reducing the distance between the target distance between the host vehicle and the preceding vehicle.

The processor 140 may compare the speed of the preceding vehicle with the target speed of the host vehicle, when the preceding vehicle is present. When the speed of the preceding vehicle is equal to or slower than the target speed of the host vehicle, the processor 140 may determine that the user feels like that the distance from the preceding vehicle is long, thereby reducing the target distance between the host vehicle and the preceding vehicle.

The processor 140 may set the distance between the host vehicle and the preceding vehicle at a time point, in which the pressing degree of the an acceleration pedal 300 is reduced, as the target distance between the host vehicle and the preceding vehicle, or may set the speed of the host vehicle at the time point, in which the pressing degree of the acceleration pedal 300 is reduced, as the target speed of the host vehicle, when the user looks ahead for a preset time in the duration form the time point, in which the user presses the acceleration pedal 300, to the time point in which the pressing degree of the acceleration pedal 300 is reduced.

When the user presses the deceleration pedal 400 immediately after starting pressing the acceleration pedal 300 and taking a foot of the user off the acceleration pedal 300, and then takes the foot of the user off the deceleration pedal 400, the processor 140 may set the distance between the host vehicle and the preceding vehicle at the time point of taking the foot of the user off the deceleration pedal 400 as the target distance between the host vehicle and the preceding vehicle or may set the speed of the host vehicle at the time point that the user takes the foot of the user off the deceleration pedal 400, as the target speed of the host vehicle.

When there is present the preceding vehicle driving at a speed faster than the target speed of the host vehicle, and when the user presses the deceleration pedal 400 immediately after starting pressing the acceleration pedal 300 and taking a foot of the user off the acceleration pedal 300, and takes a foot of the user off the deceleration pedal 400, the processor 140 may set the distance between the host vehicle and the preceding vehicle at the time point that the user takes the foot of the user off the deceleration pedal 400 as the target distance between the host vehicle and the preceding vehicle or may set the speed of the host vehicle at the time point that the user takes the foot of the user off the acceleration pedal 300, as the target speed of the host vehicle.

The processor 140 may determine whether the preceding vehicle is present, when the user looks ahead for a preset time, and presses the deceleration pedal 400, and may determines that the user feels like that the current speed of the host vehicle is fast to reduce the target speed of the host vehicle, when the preceding vehicle is absent.

The processor 140 may determine that the user feels that the distance between the host vehicle and the preceding vehicle is short and may increase the target distance between the host vehicle and the preceding vehicle, when the user looks ahead for a preset time and there is present the preceding vehicle in the state that the user presses the deceleration pedal 400.

The processor 140 may increase the target distance between the host vehicle and the preceding vehicle, when the user looks ahead for a preset time in the state that the user presses the deceleration pedal 400 for at least a preset time and the longitudinal acceleration is at least a specific value.

The processor 140 may set the distance between the host vehicle and the preceding vehicle at a time point, in which the pressing degree of the deceleration pedal 400 is reduced, as the target distance between the host vehicle and the preceding vehicle, or may set the speed of the host vehicle at the time point, in which the pressing degree of the deceleration pedal 400 is reduced, as the target speed of the host vehicle, when the user looks ahead for a preset time in the duration form the time point, in which the user presses the deceleration pedal 400, to the time point in which the pressing degree of the deceleration pedal 400 is reduced.

When the user presses the acceleration pedal 300 immediately after starting pressing the deceleration pedal 400 and taking a foot of the user off the deceleration pedal 400 and takes the foot of the user off the acceleration pedal 300, the processor 140 may set the distance between the host vehicle and the preceding vehicle at the time point of taking the foot of the user off the acceleration pedal 300 as the target distance between the host vehicle and the preceding vehicle or may set the speed of the host vehicle at the time point that the user takes the foot of the user off the acceleration pedal 300, as the target speed of the host vehicle.

The processor 140 may determine whether the surrounding vehicle is present, when the user looks ahead for a preset time, changes a lane, or performs steering. The processor 140 determines that the user wants driving while avoiding the surrounding vehicle, and may control the host vehicle to perform bias driving while avoiding left and right vehicles, when the surrounding vehicle is present.

The processor 140 may determine whether the surrounding vehicle is present, when the user looks ahead for a preset time, changes a lane, or performs steering. The processor 140 may determine that the user feels dissatisfactory to the driving position of the host vehicle on the current lane and may adjust the driving position of the host vehicle on the current lane when the surrounding vehicle is absent.

The processor 140 may determine whether the user looks ahead until the time point that the steering is finished when the steering is performed at a specific angle or more. The processor 140 may determine that the steering is finished, when the steering angle is maintained at the specific angle or less for a preset time, or when the steering angular velocity is maintained to a specific angular velocity or less for a preset time.

The processor 140 may set the lateral position within the lane at the time point that the steering is finished as the target lateral position of the host vehicle when the user looks ahead in the duration from the time point, in which the adjustment of the lateral position for driving within the lane is started, to the time point in which the steering is finished. In addition, the processor 140 may set the lateral position of the host vehicle at the time point that the steering in an opposition direction is terminated, as the target lateral position of the host vehicle, when the steering is performed and immediately performed in an opposite direction.

The sensing module 200 may include a plurality of sensor to sense external objects around the vehicle and may obtain information on the position of the external object, the speed of the external object, the moving direction of the external object, and/or the type (e.g., vehicles, pedestrians, bicycles or motorcycles) of the external object. To this end, the sensing module 200 may include a camera, an ultrasonic sensor, a radar, a camera, a laser scanner and/or a corner radar, a LiDAR, an acceleration sensor, a yaw rate sensor, a torque measurement sensor and/or a wheel speed sensor, a steering angle sensor, or the like.

According to the present disclosure, the sensing module 200 may include a camera mounted in the vehicle to monitor the user (driver), and transmits the captured image data to the vehicle driving assistance controlling apparatus 100. In this case, the camera in the vehicle may include a driver status monitoring (DSM) camera which is a camera to monitor the driver.

The acceleration pedal 300 may be manipulated by the user to accelerate the vehicle. The deceleration pedal 400 may be manipulated by the user to decelerate the vehicle. The steering wheel 500 may be manipulated by the user for steering adjustment of the vehicle. When the manipulation of the acceleration pedal 300, the deceleration pedal 400, and the steering wheel 500 occurs, information on the manipulation may be instantly transmitted to the vehicle driving assistance controlling apparatus 100.

The steering controller 600 may be configured to control the steering angle of the vehicle, and may include a steering wheel, an actuator operating together with the steering wheel, and a controller to control the actuator.

The braking controller 700 may be configured to control the braking of the vehicle, and may include a controller to control a brake.

The engine controller 800 may be configured to control the engine driving of the vehicle, and may include a controller to control the speed of the vehicle.

Figure 2:
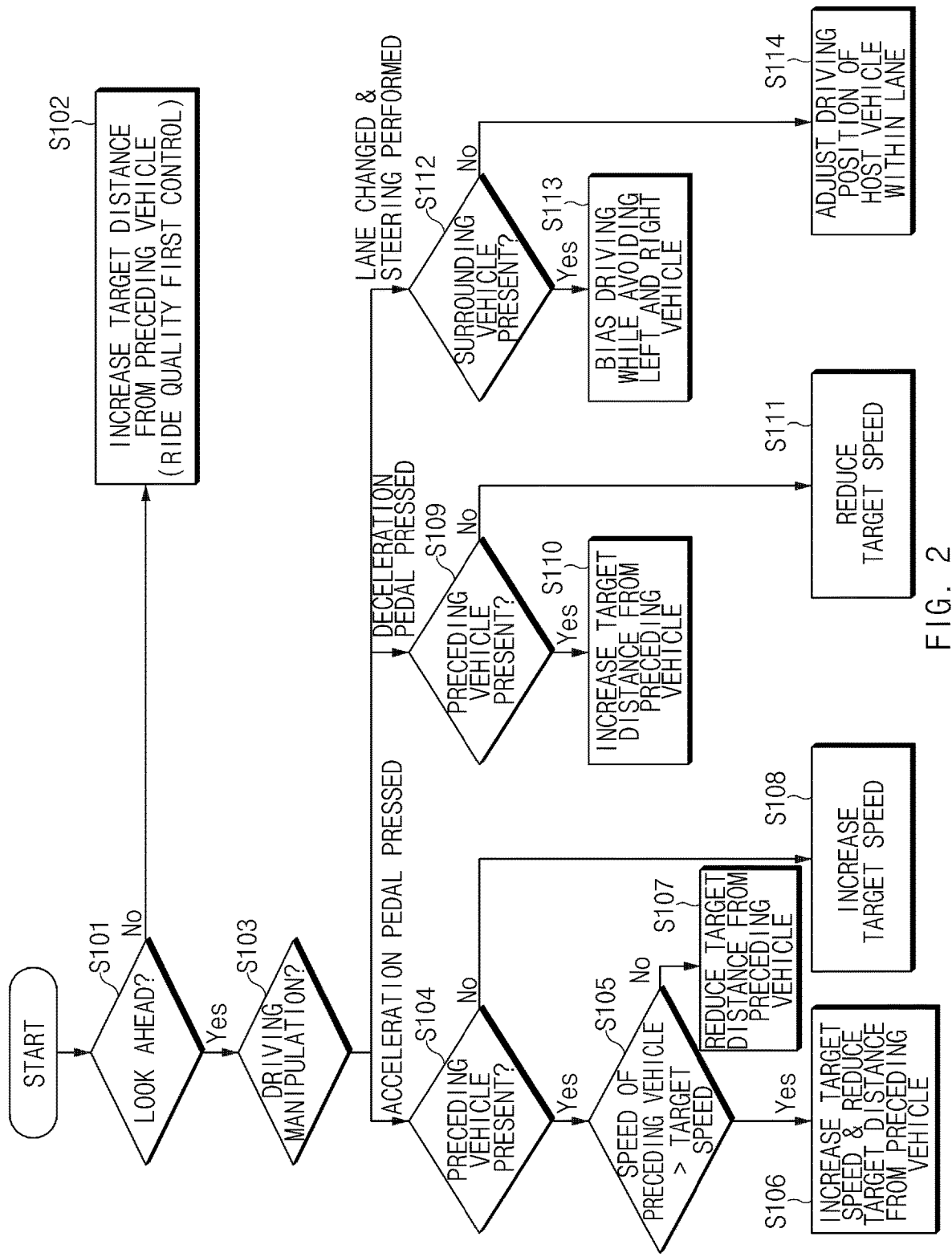
FIG. 2 is a flowchart illustrating a method for controlling the driving assistance of a vehicle, according to an embodiment of the present disclosure.

Hereinafter, a method for controlling the driving assistance of a vehicle will be described in detail with reference to FIG. 2, according to an embodiment of the present disclosure. FIG. 2 is a flowchart illustrating a method for controlling the driving assistance of a vehicle, according to an embodiment of the present disclosure.

The following description will be made on the assumption that the vehicle driving assistance controlling apparatus 100 of FIG. 1 performs a process of FIG. 2. In addition, in the description made with reference to FIG. 2, it may be understood that operations described as being performed by an apparatus are controlled by the processor 140 of the vehicle driving assistance controlling apparatus 100.

Referring to FIG. 2, the vehicle driving assistance controlling apparatus 100 checks the direction that the user looks at based on image data obtained from the camera of the sensing module 200, and determines whether the user looks ahead for a preset time (e.g., 15 seconds) (S101).

When the user does no look ahead for the preset time, the vehicle driving assistance controlling apparatus 100 may determine that the user does not want to participate in driving, but wants to do something (e.g., reading, viewing an image, sleeping, or the like) except the driving, and may change the setting of the driving assistance function to a ride quality first mode (S102).

As described above, for the controlling of the ride quality first driving assistance, the vehicle driving assistance controlling apparatus 100 may reduce the ratio of reflecting the speed of the preceding vehicle and an acceleration in the speed of the host vehicle, increase the distance from the preceding vehicle, may change a setting value such that a jerk is reduced in longitudinal and lateral-direction controlling (restrict the jerk), and may speed the speed in driving on a curved lane.

When it is determined that the user looks ahead for a preset time in operation S101, the vehicle driving assistance controlling apparatus 100 may keep performing driving assistance controlling based on the driving assistance controlling setting value, which is current set.

Accordingly, the vehicle driving assistance controlling apparatus 100 determines whether the manipulation of the driving occurs in the state that the user looks ahead for the preset time (S103).

In this case, when the user manipulates the driving in the state that the driving assistance controlling function is activated, the vehicle driving assistance controlling apparatus 100 may determine that the user does not want to follow the control of the driving assistance controlling function, and may change the driving assistance controlling setting value depending on the form of the manipulation performed by the user. In this case, the form of the manipulation of the driving may include whether the acceleration pedal is pressed, whether the deceleration pedal is pressed, or whether the steering wheel is manipulated.

First, when the acceleration pedal is pressed as the form of the manipulation of the driving, the vehicle driving assistance controlling apparatus 100 determines whether the preceding vehicle is present (S104). In this case, the vehicle driving assistance controlling apparatus 100 may determine whether the preceding vehicle is present, based on the sensing result from the sensing module 200.

When it is determined in operation S104 that the preceding vehicle is present, the vehicle driving assistance controlling apparatus 100 determines whether the speed of the preceding vehicle is faster than the target speed of the host vehicle, which is set for the driving assistance controlling of the host vehicle (S105).

When the speed of the preceding vehicle is faster than the target speed of the host vehicle, which is set for the driving assistance controlling of the host vehicle in operation S105, the vehicle driving assistance controlling apparatus 100 increases the target speed for the driving assistance controlling of the host vehicle and reduces the set distance between the host vehicle and the preceding vehicle (S106). In this case, the set distance between the host vehicle and the preceding vehicle is preset for the driving assistance controlling. The vehicle driving assistance controlling apparatus 100 performs a control operation such that the set distance between the host vehicle and the preceding vehicle is maintained in the driving assistance controlling.

In other words, when the user continuously presses the acceleration pedal under the situation that the preceding vehicle is present and is driving at the speed faster than the speed of the host vehicle during the driving assistance controlling, the vehicle driving assistance controlling apparatus 100 determines that the user wants to increase the speed of the host vehicle because the current speed (target speed) of the host vehicle is slow and the distance from the preceding vehicle is long. Accordingly, the vehicle driving assistance controlling apparatus 100 reduces the distance between the host vehicle and the preceding vehicle by increasing the target speed of the host vehicle and reducing the set distance between the host vehicle and the preceding vehicle.

Meanwhile, when it is determined in operation S105 that the speed of the preceding vehicle is slower than or equal to the target speed of the host vehicle, the vehicle driving assistance controlling apparatus 100 determines that the user feels like that the distance between the host vehicle and the preceding vehicle is long and reduces the distance between the host vehicle and the preceding vehicle (S107). For example, if the distance between the host vehicle and the preceding vehicle is long in the traffic jam situation, a surrounding vehicle may cut in front of the host vehicle. In this case, a control operation may be performed to reduce the distance between the host vehicle and the preceding vehicle because it is possible for the surrounding vehicle to cut in front of the host vehicle as the distance between the host vehicle and the preceding vehicle is long even though the user does not feel dissatisfactory to the current target speed of the host vehicle.

Meanwhile, when it is determined in operation S104 that the preceding vehicle is absent, the vehicle driving assistance controlling apparatus 100 determines that the user wants to increase the target speed because the current target speed is slow, and increases the target speed of the host vehicle (S108).

As described above, when the user presses the acceleration pedal even though the preceding vehicle is present, the vehicle driving assistance controlling apparatus 100 may determine that the user wants to increase the target speed of the host vehicle or to reduce the distance from the preceding vehicle because the user feels like that the speed of the host vehicle is slow or the distance from the preceding vehicle is long. In addition, when the user presses the acceleration pedal even though the preceding vehicle is absent, the vehicle driving assistance controlling apparatus 100 may determine that the user wants to increase the target speed because the user feels like that the speed of the host vehicle is slow.

In addition, when the user presses the acceleration pedal even though there is present the preceding vehicle driving at the speed faster than the speed of the host vehicle, the vehicle driving assistance controlling apparatus 100 determines that the user wants to reduce the distance from the preceding vehicle while increasing the target speed of the host vehicle, and increases the set distance between the host vehicle and the preceding vehicle and increases the target speed of the host vehicle.

To the contrary, when the user presses the acceleration pedal even though there is present the preceding vehicle driving at the speed slower than the speed of the host vehicle, the vehicle driving assistance controlling apparatus 100 reduces the set distance between the host vehicle and the preceding vehicle because the user feels like that the distance between the host vehicle and the preceding vehicle is significantly long.

Meanwhile, the following description will be made regarding the case that the user presses the deceleration pedal as the form of the driving manipulation in operation S103. In this case, the user presses the deceleration pedal when the user feels like that the distance from the preceding vehicle is close or the target speed is fast, and the relevant setting value may be changed and applied depending on whether the preceding vehicle is present.

First, when the user presses the deceleration pedal, the vehicle driving assistance controlling apparatus 100 determines whether the preceding vehicle is present (S109).

When the preceding vehicle is present in the state that the user presses the deceleration pedal, the vehicle driving assistance controlling apparatus 100 determines that the user feels like that the distance between the host vehicle and the preceding vehicle is significantly close, and increases and sets the set distance between the host vehicle and the preceding vehicle (S110).

To the contrary, when the preceding vehicle is absent in the state that the user presses the deceleration pedal, the vehicle driving assistance controlling apparatus 100 determines that the user feels like that the target speed of the host vehicle is significantly fast, and decreases and sets the target speed of the host vehicle (S111).

Meanwhile, the following description will be made regarding the case that the user changes a lane or manipulates the steering wheel, as the form of the driving manipulation in operation S103. Since the vehicle driving assistance controlling apparatus 100 follows the centerline of the lane or copes with a curved lane when performing the driving assistance controlling function, the case that the user manipulates the steering wheel while utilizing the driving assistance controlling function is the case that the user tries to change the lane or to change the lateral position within the lane that the host vehicle is currently driving. Accordingly, the vehicle driving assistance controlling apparatus 100 may determine whether the user wants to change the lane or to change the lateral position within the lane that the host vehicle is currently driving, when the user manipulates the steering wheel, and may determine whether to change the setting value.

In this case, when the lane is changed after the steering wheel is manipulated, when the turn signal is input, or when the steering is performed rapidly and at a large angle to the extent that the host vehicle deviates from the lane, the vehicle driving assistance controlling apparatus 100 determines that the user wants to change the lane without feeling dissatisfactory to the setting for the lateral-direction controlling, and does not change the setting value.

To the contrary, when the lane is not changed, the vehicle driving assistance controlling apparatus 100 may determine that the user wants to change the lateral position of the host vehicle and may change the setting value. In this case, the vehicle driving assistance controlling apparatus 100 determines whether the cause that the user wants to change the lateral position of the host vehicle is made by the surrounding vehicle or the personal preference, and applies the determination.

In other words, when the user changes the lane or manipulates the steering wheel, the vehicle driving assistance controlling apparatus 100 determines whether the surrounding vehicle is present (S112).

When surrounding vehicles are present on the left and right side, the vehicle driving assistance controlling apparatus 100 may determine that the user wants to drive while avoiding the surrounding vehicles, and may control bias driving while avoiding the surrounding vehicles on the left and right sides (S113). When a vehicle is present only on one adjacent lane (a left lane or a right lane) and when the user performs the steering to drive the host vehicle while the lane, on which the host vehicle is driving, while being away from the vehicle on the adjacent lane, the vehicle driving assistance controlling apparatus 100 may change the setting value to perform bias driving within a lane while avoiding an adjacent vehicle under the same situation in the future.

To the contrary, when the user adjusts the lateral position of the host vehicle in the state that the surrounding vehicle is absent on the adjacent lane, the vehicle driving assistance controlling apparatus 100 may determine that the lateral position is adjusted due to the personal preference and may change a vehicle position setting value of a lane centerline following function (S114).

Figure 3:
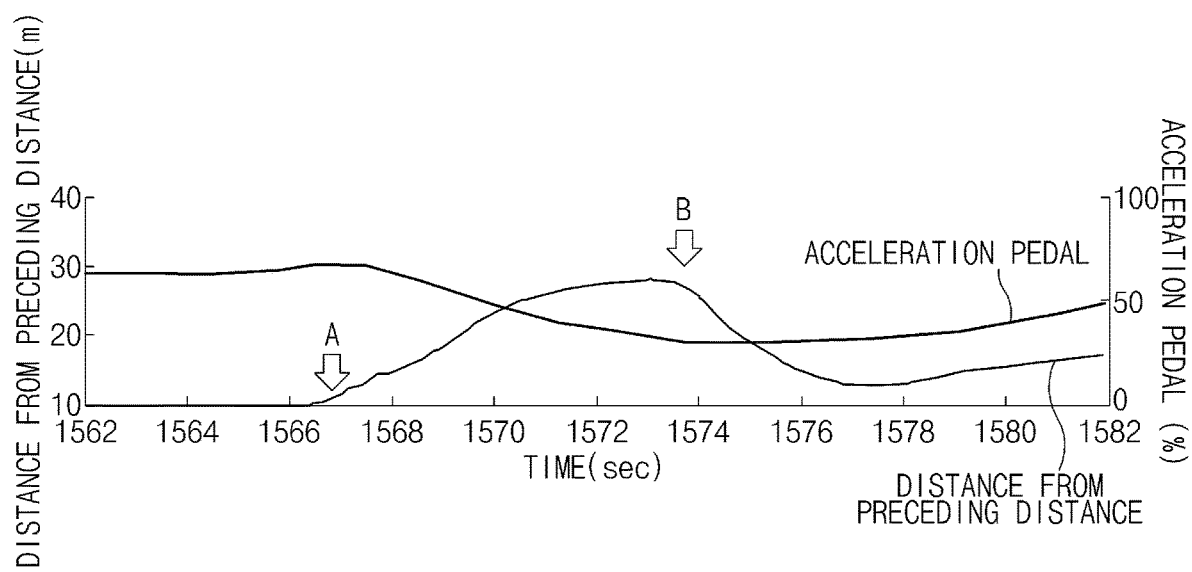
FIG. 3 is a graph illustrating that a driving assistance controlling setting value is changed when an acceleration pedal is pressed in controlling the driving assistance of the vehicle, according to the embodiment of the present disclosure.

FIG. 3 is a graph illustrating that a driving assistance controlling setting value is changed when an acceleration pedal is pressed in the driving assistance controlling of the vehicle, according to the embodiment of the present disclosure.

The following description will be made in detail regarding the case that the user presses the acceleration pedal during the driving assistance controlling, and the preceding vehicle is present (see S107 of FIG. 2).

When the user presses the acceleration pedal during the driving assistance controlling (5% or more+two seconds or more), it is determined whether the user looks ahead at a specific ratio (60%) or more from the time point that the user presses the acceleration pedal to the time point that the user takes a foot of the user off the acceleration pedal. When it is determined that the user looks ahead at the specific ratio or more, the driving assistance controlling setting value is changed. In this case, the time that the acceleration pedal is pressed is considered because the pressing for a short time is to mainly cope with an instant situation instead of changing the setting.

A time point of "A" of FIG. 3 is a time point that the user presses the acceleration pedal during the driving assistance controlling as the user feels like that the distance between the host vehicle and the preceding vehicle is long. As described above, when the user presses the acceleration pedal during the use of the driving assistance function, the vehicle driving assistance controlling apparatus 100 determines that the user feels dissatisfactory to the current setting for the driving assistance controlling.

A time point of "B" is a time point that the user reduces the pressing degree of the acceleration pedal because the user feels like that the distance between the host vehicle and the preceding vehicle is appropriate, during the driving assistance controlling. When the time that the user looks ahead corresponds to a specific ratio or more (e.g., 60%) in the duration between the time point of "A" and the time point of "B", the vehicle driving assistance controlling apparatus 100 may determine that the user looks ahead and may set the distance between the host vehicle and the preceding vehicle at the time point of "B" as the target distance.

Meanwhile, when the time that the user looks ahead corresponds to the specific ratio or less, the vehicle driving assistance controlling apparatus 100 maintains the target distance between the host vehicle and the preceding vehicle, which is currently set, for ride quality first controlling because of determining that the user does not look ahead.

In addition, the vehicle driving assistance controlling apparatus 100 may determine, as the time point of "B", the time point that the user takes the foot of the user off the deceleration pedal when taking the foot of the off the acceleration pedal and then pressing the deceleration pedal. This situation is the case that the user presses the acceleration pedal to reduce the distance between the host vehicle and the preceding vehicle, considers the distance significantly reduced, and presses the deceleration pedal. Accordingly, the time point that the user takes the foot of the user off the deceleration pedal may be a target distance setting value.

The following description will be made in detail regarding the case that the user presses the acceleration pedal during the driving assistance controlling, and the preceding vehicle is absent (see S108 of FIG. 2).

When the time that the user looks ahead corresponds to a specific ratio or more (e.g., 60%) in the duration between the time point of "A" that the user presses the acceleration pedal and the time point of "B" that the user reduces the pressing degree of the acceleration pedal during the driving assistance controlling, the vehicle driving assistance controlling apparatus 100 may determine that the user looks ahead and may set the speed of the host vehicle at the time point of "B" as the target speed. Meanwhile, when the time that the user looks ahead corresponds to the specific ratio or less, the vehicle driving assistance controlling apparatus 100 maintains the current target speed.

In addition, the vehicle driving assistance controlling apparatus 100 may determine, as the time point of "B", the time point that the user takes the foot of the user off the deceleration pedal when taking the foot of the user off the acceleration pedal and then immediately pressing the deceleration pedal. This situation is the case that the user presses the acceleration pedal to increase the speed of the host vehicle, considers the speed of the host vehicle significantly high, and presses the deceleration pedal. Accordingly, the vehicle driving assistance controlling apparatus 100 may set the speed at the time point that the user takes the foot of the user off the deceleration pedal, as the target speed.

The following description will be made in detail regarding the case that the user presses the acceleration pedal during the driving assistance controlling, and the preceding vehicle driving at the speed faster than the target speed is present (see S106 of FIG. 2).

When the time that the user looks ahead corresponds to a specific ratio or more (e.g., 60%) in the duration between the time point of "A" that the user presses the acceleration pedal and the time point of "B" that the user reduces the pressing degree of the acceleration pedal during the driving assistance controlling, the vehicle driving assistance controlling apparatus 100 may determine that the user looks ahead, may set the speed of the host vehicle at the time point of "B" as the target speed and may set the distance between the host vehicle and the preceding vehicle at the time point of "B" as the target distance. Meanwhile, when the time that the user looks ahead corresponds to the specific ratio or less, the vehicle driving assistance controlling apparatus 100 maintains the current target speed and the current target distance.

The vehicle driving assistance controlling apparatus 100 may determine, as the time point of "B", the time point that the user takes the foot of the user off the deceleration pedal when taking the foot of the user off the acceleration pedal and then immediately pressing the deceleration pedal. This situation is the case that the user presses the acceleration pedal to reduce the distance from the preceding vehicle, considers the distance significantly reduced, and presses the deceleration pedal. Accordingly, although the vehicle driving assistance controlling apparatus 100 sets the distance between the host vehicle and the preceding vehicle at the time point of "B" that the user takes the foot of the user off the deceleration pedal, as the target distance, the vehicle driving assistance controlling apparatus 100 sets the speed of the host vehicle at the time point that the user takes the foot of the user off the acceleration pedal, as the target speed. At the time point that the user takes the foot of the user off the deceleration pedal, the speed for reducing the distance from the preceding vehicle has been already lowered. Accordingly, if the speed at this point is set as the target speed, the host vehicle may become continuously away from the preceding vehicle.

Figure 4:
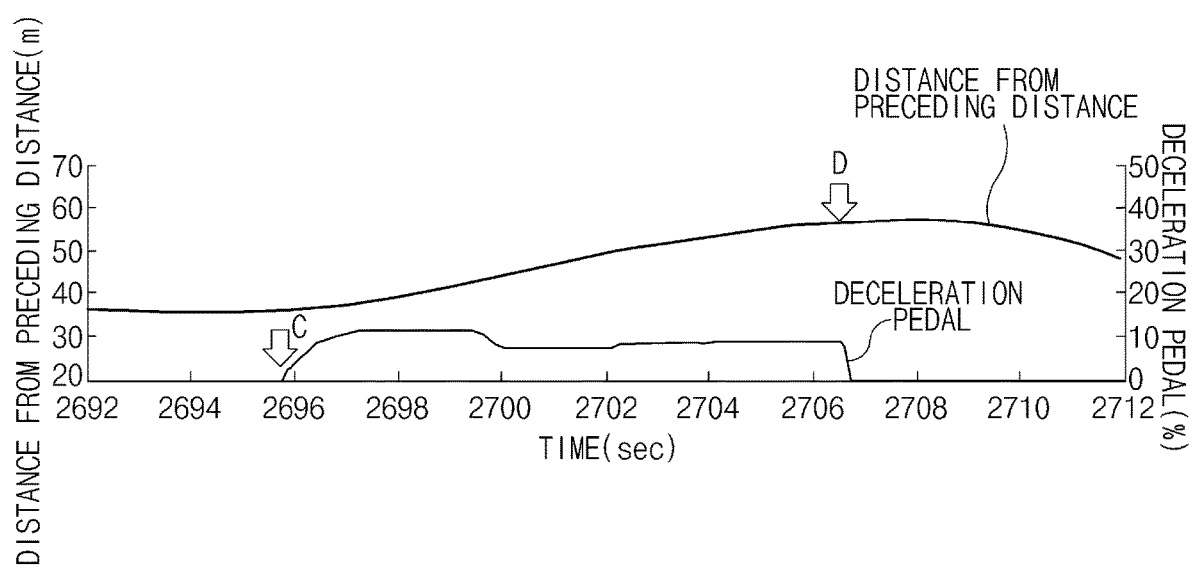
FIG. 4 is a graph illustrating that a driving assistance controlling setting value is changed when a deceleration pedal is pressed in controlling the driving assistance of the vehicle, according to the embodiment of the present disclosure.

FIG. 4 is a graph illustrating that a driving assistance controlling setting value is changed when a deceleration pedal is pressed in the driving assistance controlling of the vehicle, according to the embodiment of the present disclosure.

The following description will be made in detail regarding the case that the user presses the deceleration pedal during the driving assistance controlling, and the preceding vehicle is present (see S110 of FIG. 2).

When the user presses the deceleration pedal during the driving assistance controlling (e.g., SCC) (5% or more+two seconds or more+longitudinal acceleration>−0.5 g), the vehicle driving assistance controlling apparatus 100 determines whether the user looks ahead at a specific ratio (60%) or more from the time point that the user presses the deceleration pedal to the time point that the user takes a foot of the user off the deceleration pedal. When the user looks ahead, the vehicle driving assistance controlling apparatus 100 changes the setting value. In this case, the time that the deceleration pedal is pressed and the longitudinal acceleration are considered because the pressing for a short time or the rapid pressing is to cope with an instant situation instead of changing the setting.

A time point of "C" of FIG. 4 is a time point that the user presses the deceleration pedal as the user feels like that the distance between the host vehicle and the preceding vehicle is close, during the driving assistance controlling. As described above, when the user presses the deceleration pedal during the driving assistance controlling, the vehicle driving assistance controlling apparatus 100 determines that the user feels dissatisfactory to the current setting.

A time point of "D" is a time point that the user reduces the pressing degree of the deceleration pedal because the user feels like that the distance between the host vehicle and the preceding vehicle is appropriate.

When the time that the user looks ahead corresponds to a specific ratio or more (e.g., 60%) in the duration between the time point of "C" and the time point of "D", the vehicle driving assistance controlling apparatus 100 may determine that the user looks ahead and may set the distance between the host vehicle and the preceding vehicle at the time point of "D" as the target distance. To the contrary, when the time that the user looks ahead corresponds to the specific ratio or less, the vehicle driving assistance controlling apparatus 100 maintains the current target distance between the host vehicle and the preceding vehicle without change. It is determined, as the time point of "D", the time point that the user takes the foot of the user off the acceleration pedal when taking the foot of the user off the deceleration pedal and then immediately pressing the acceleration pedal. This situation is the case that the user presses the deceleration pedal to increase the distance from the preceding vehicle, considers the distance significantly long, and presses the acceleration pedal. Accordingly, the vehicle driving assistance controlling apparatus 100 sets the distance between the host vehicle and the preceding vehicle at the time point that the user takes the foot of the user off the acceleration pedal, as the target distance.

The following description will be made in detail regarding the case that the user presses the deceleration pedal during the driving assistance controlling, and the preceding vehicle is absent (see S111 of FIG. 2).

When the time that the user looks ahead corresponds to a specific ratio or more (e.g., 60%) from the time point of "C" that the user presses the deceleration pedal and to time point of "D" that the user reduces the pressing degree of the deceleration pedal during the driving assistance controlling, the vehicle driving assistance controlling apparatus 100 may determine that the user looks ahead and may set the speed of the host vehicle at the time point of "D" as the target speed. Meanwhile, when the time that the user looks ahead corresponds to the specific ratio or less, the vehicle driving assistance controlling apparatus 100 maintains the current target speed without change. The vehicle driving assistance controlling apparatus 100 may determine, as the time point of "D", the time point that the user takes the foot of the user off the acceleration pedal when taking the foot of the user off the deceleration pedal and then immediately pressing the acceleration pedal. This situation is the case that the user presses the deceleration pedal to reduce the speed, considers the speed significantly low, and presses the acceleration pedal. Accordingly, the vehicle driving assistance controlling apparatus 100 sets the speed of the host vehicle at the time point that the user takes the foot of the user off the acceleration pedal, as the target speed.

Figure 5:
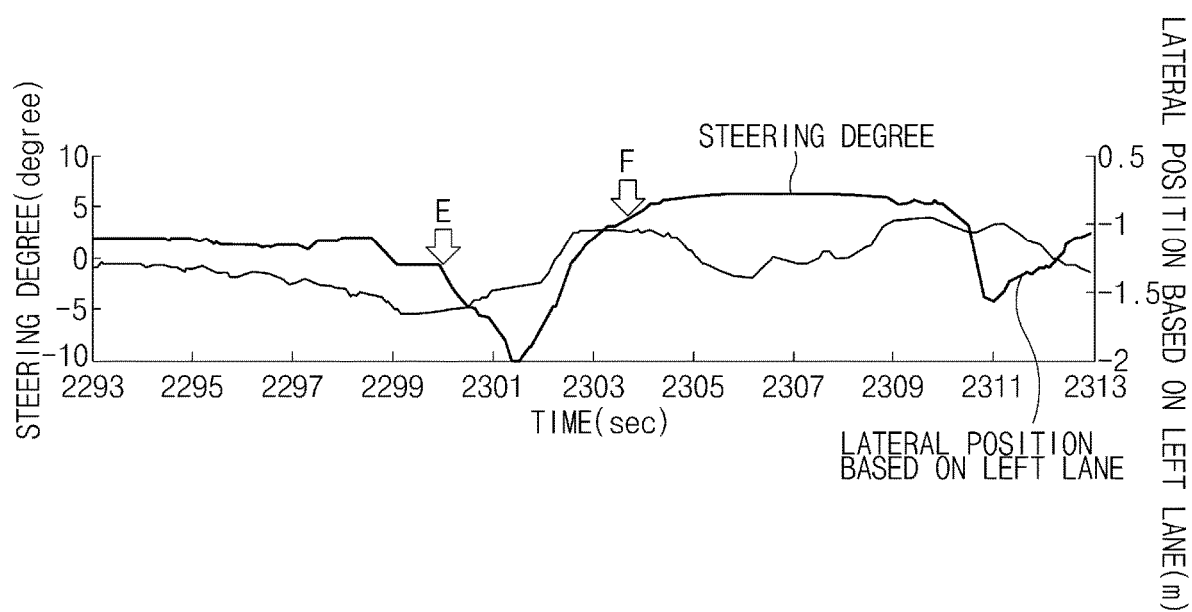
FIG. 5 is a graph illustrating that a driving assistance controlling setting value is changed when steering is manipulated in controlling the driving assistance of the vehicle, according to the embodiment of the present disclosure.

FIG. 5 is a graph illustrating that a driving assistance controlling setting value is changed when steering manipulation occurs in the driving assistance controlling of the vehicle, according to the embodiment of the present disclosure.

The following description will be made in detail regarding the case that there is no vehicle at left and right lanes in the state that the steering is performed during the driving assistance controlling (see S113 of FIG. 2).

The vehicle driving assistance controlling apparatus 100 determines whether the user looks ahead at a specific ratio (60%) or more from the time point that the user performs the steering (at 5° or more) to the time point that the user finishes the steering (the steering angle is maintained at 3° or less for 2 seconds and the steering angular velocity is maintained at 20°/second). When the user looks ahead, the vehicle driving assistance controlling apparatus 100 changes the setting value. In this case, the steering angular velocity is considered because the rapid steering is to mainly cope with an instant situation instead of changing the setting.

The time point of "E" of FIG. 5 is a time point that the lateral position of the host vehicle within the lane is adjusted during the driving assistance controlling. When the user performs the steering during the driving assistance controlling, the vehicle driving assistance controlling apparatus 100 determines that the user feels dissatisfactory to the current setting.

The time point of "F" is a time point that the user does not perform the steering because the user feels like that the current lateral position is appropriate. When the time that the user looks ahead corresponds to a specific ratio or more (e.g., 60%) in the duration between the time point of "E" and the time point of "F", the vehicle driving assistance controlling apparatus 100 may determine that the user looks ahead and may set the lateral position of the host vehicle within the lane at the time point of "F" as the target position. To the contrary, when the time that the user looks ahead corresponds to the specific ratio or less, the vehicle driving assistance controlling apparatus 100 maintains the current target lateral position without change. In this case, when the steering is performed in an opposite direction immediately after the steering has been performed in one direction, the time point that the steering in the opposite direction is terminated is regarded as the time point of "F". This situation is the case that the user performs the steering to adjust the lateral position of the host vehicle, considers the lateral position excessively moving, and performs the steering in the opposition direction. Accordingly, the vehicle driving assistance controlling apparatus 100 may set the lateral position at the time point that the steering is terminated, as a lateral position setting value.

The following description will be made in detail regarding the case that there is present a vehicle on an adjacent lane in the state that the steering is performed during the driving assistance controlling (see S114 of FIG. 2).

When the time that the user looks ahead corresponds to a specific ratio or more (e.g., 60%) in the duration between the time point of "E" that the steering is started and the time point of "F" that the steering is finished, the vehicle driving assistance controlling apparatus 100 may determine that the user looks ahead and may set a lateral-direction avoidance degree in the bias driving as a setting value. Meanwhile, when the time that the user looks ahead corresponds to the specific ratio or less, the vehicle driving assistance controlling apparatus 100 maintains a current lateral position setting value without change.

As described above, the vehicle driving assistance controlling apparatus 100 may monitor whether the user looks ahead, may perform vehicle driving assistance controlling in the ride quality first mode when the user does not look ahead, and may change or maintain the setting value of the driving assistance controlling function depending on whether the acceleration pedal is manipulated, whether the deceleration pedal is manipulated, or whether the steering is performed when the user looks ahead. Accordingly, the intent of the user may be exactly detected and applied even during the driving assistance controlling, thereby increasing the user convenience.

For example, the user may prefer to making the host vehicle close to the preceding vehicle as much as possible when the user worries about whether another vehicle cuts in front of the host vehicle in the traffic jam situation. However, when the user does not have to worry about that the another vehicle cuts in, the user has a tendency to comfortably following the preceding vehicle to prevent the rid quality from being degraded as the speed is frequently changed. Regarding the driving assistance controlling, when the user looks ahead, the user wants to more frequently perform deceleration and acceleration to arrive at the destination more quickly. However, when the user does not look ahead, the user wants ride quality first controlling. Accordingly, according to the present disclosure, the setting for preference controlling, which is frequently changed, is rapidly and intuitively changed and applied, thereby increasing the usability of the driving assistance controlling function.

Figure 6:
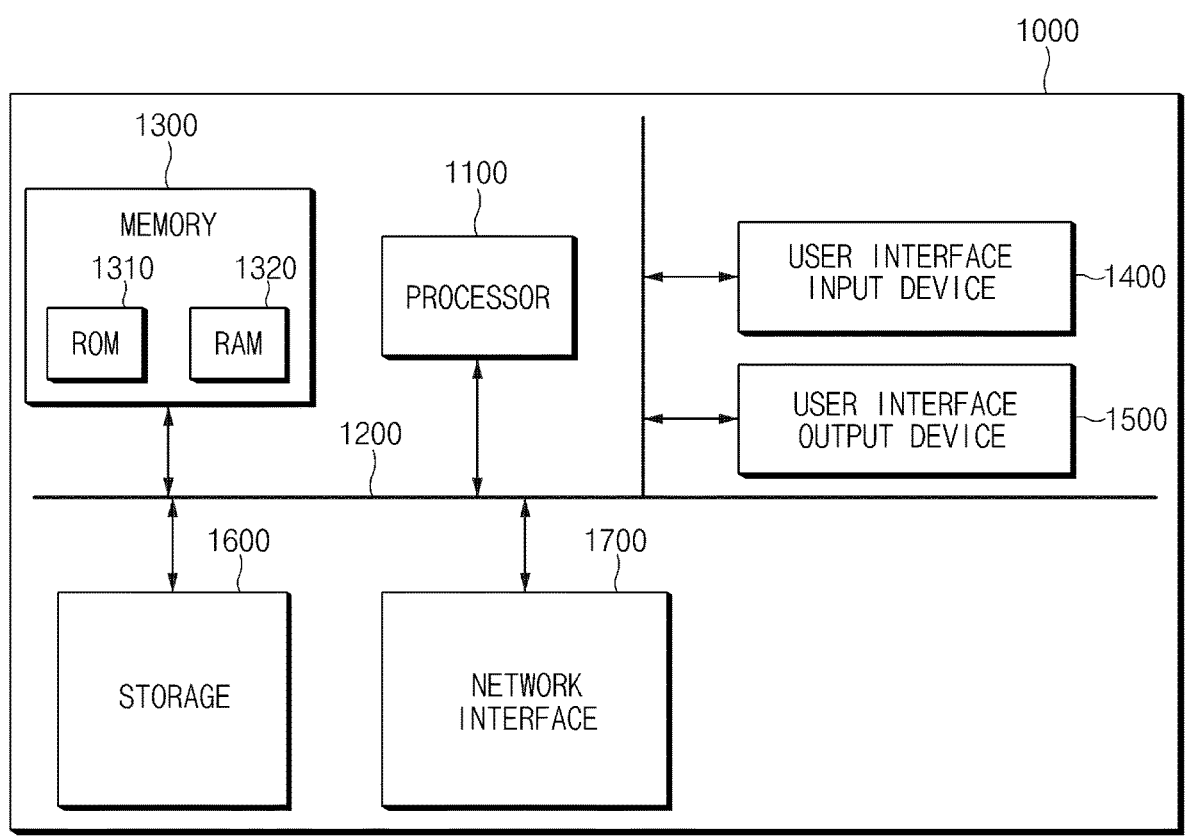
FIG. 6 illustrates a computing system, according to an embodiment of the present disclosure.

FIG. 6 illustrates a computing system, according to an embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the present disclosure, the driving assistance controlling setting value may be changed and maintained by detecting the intent of a user based on at least one of whether a user looks ahead, manipulates an acceleration pedal, manipulates a deceleration pedal, or performs steering, thereby increasing the convenience of a user.

Besides, a variety of effects directly or indirectly understood through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The invention claimed is:

1. An apparatus for controlling driving assistance for a vehicle, the apparatus comprising:
  a processor configured to adjust a driving assistance controlling setting value, based on whether a user looks ahead, whether the user performs a driving manipulation, and a driving condition during driving assistance of the vehicle; and
  a storage to store the driving assistance controlling setting value,
  wherein the processor is configured to:
    determine whether a preceding vehicle is present, when the user looks ahead for a preset time and presses a deceleration pedal, and
    decrease a target speed of a host vehicle, when the preceding vehicle is absent.

2. The apparatus of claim 1, wherein the processor is configured to:
  increase a distance between a host vehicle and a preceding vehicle, when the user does not look ahead for a preset time.

3. The apparatus of claim 1, wherein the driving manipulation includes:
  at least one of whether an acceleration pedal is manipulated, whether a deceleration pedal is manipulated, whether a lane is changed, and whether steering is performed.

4. The apparatus of claim 1, wherein the driving condition includes:
at least one of whether a preceding vehicle is present, a difference in a target speed between the preceding vehicle and a host vehicle, and whether a surrounding vehicle is present.

5. The apparatus of claim 1, wherein the processor is configured to:
determine whether a preceding vehicle is present, when the user looks ahead for a preset time and presses an acceleration pedal; and
increase a target speed of a host vehicle, when the preceding vehicle is absent.

6. The apparatus of claim 5, wherein the processor is configured to:
compare a speed of the preceding vehicle and the target speed of the host vehicle, when the preceding vehicle is present; and
increase the target speed of the host vehicle and reduce a target distance between the host vehicle and the preceding vehicle, when the speed of the preceding vehicle is faster than the target speed of the host vehicle.

7. The apparatus of claim 5, wherein the processor is configured to:
compare a speed of the preceding vehicle and the target speed of the host vehicle, when the preceding vehicle is present; and
reduce a target distance between the host vehicle and the preceding vehicle, when the speed of the preceding vehicle is equal to or slower than the target speed of the host vehicle.

8. The apparatus of claim 1, wherein the processor is configured to:
set a distance between a host vehicle and a preceding vehicle at a time point that the user reduces a pressing degree of an acceleration pedal, as a target distance between the host vehicle and the preceding vehicle; or
set a speed of the host vehicle at the time point that the user reduces the pressing degree of the acceleration pedal, as a target speed of the host vehicle,
when the user looks ahead in a duration from a time point that the user presses the acceleration pedal to a time point that the user reduces a pressing degree of the acceleration pedal.

9. The apparatus of claim 1, wherein the processor is configured to:
set a distance between a host vehicle and a preceding vehicle at a time point that the user takes a foot of the user off a deceleration pedal, as a target distance between the host vehicle and the preceding vehicle; or
set a speed of the host vehicle at the time point that the user takes the foot of the user off the deceleration pedal, as a target speed of the host vehicle,
when the user presses the deceleration pedal immediately after starting pressing an acceleration pedal and taking the foot of the user off the acceleration pedal, and then takes the foot of the user off the deceleration pedal.

10. The apparatus of claim 1, wherein the processor is configured to:
set a distance between a host vehicle and a preceding vehicle at a time point that the user takes the foot of the user off a deceleration pedal, as a target distance between the host vehicle and the preceding vehicle; and
set a speed of the host vehicle at a time point that the user takes the foot of the user off an acceleration pedal, as a target speed of the host vehicle,
when a preceding vehicle, which is driving at a speed faster than the target speed of the host vehicle, is present, and when the user presses the deceleration pedal immediately after starting pressing the acceleration pedal and taking the foot of the user off the acceleration pedal, and then takes the foot of the user off the deceleration pedal.

11. The apparatus of claim 1, wherein the processor is configured to:
increase a target distance between the host vehicle and the preceding vehicle, when the preceding vehicle is present.

12. The apparatus of claim 11, wherein the processor is configured to:
increase the target distance between the host vehicle and the preceding vehicle, when a longitudinal acceleration is a preset value or more in a state that the user presses the deceleration pedal for a preset time and when the user looks ahead for the preset time.

13. The apparatus of claim 1, wherein the processor is configured to:
set a distance between a host vehicle and a preceding vehicle at a time point that the user reduces a pressing degree of a deceleration pedal, as a target distance between the host vehicle and the preceding vehicle; or
set a speed of the host vehicle at the time point that the user reduces the pressing degree of the deceleration pedal, as a target speed of the host vehicle,
when the user looks ahead for a preset time in a duration from a time point that the user presses the deceleration pedal to the time point that the user reduces the pressing degree of the deceleration pedal.

14. The apparatus of claim 1, wherein the processor is configured to:
set a distance between a host vehicle and a preceding vehicle at a time point that the user takes the foot of the user off an acceleration pedal, as a target distance between the host vehicle and the preceding vehicle; or
set a speed of the host vehicle at the time point that the user takes the foot of the user off the acceleration pedal, as a target speed of the host vehicle,
when the user presses the acceleration pedal immediately after starting pressing a deceleration pedal and taking the foot of the user off the deceleration pedal, and then takes the foot of the user off the acceleration pedal.

15. The apparatus of claim 1 wherein the processor is configured to:
determine whether a surrounding vehicle is present, when the user looks ahead for a preset time, changes a lane, or performs steering; and
control a host vehicle to perform bias driving while avoiding left and right vehicles when the surrounding vehicle is present.

16. The apparatus of claim 1, wherein the processor is configured to:
determine whether a surrounding vehicle is present, when the user looks ahead for a preset time, changes a lane, or performs steering; and
control a driving position of a host vehicle within the lane when the surrounding vehicle is absent.

17. The apparatus of claim 16, wherein the processor is configured to:
determine whether the user looks ahead until a time point that the steering is finished, when the steering is performed at a preset angle or more.

18. The apparatus of claim 17, wherein the processor is configured to:

determine that the steering is finished, when a steering angle is maintained at the preset angle or less for a preset time, or when a steering angular velocity is maintained to a specific angular velocity or less for a preset time.

19. The apparatus of claim 1, wherein the processor is configured to:
set a lateral position of a host vehicle within a lane at a time point that steering is finished, as a target lateral position of the host vehicle,
when the user looks ahead for a preset time in a duration from a time point that driving lateral position adjustment is started within the lane to a time point that the steering is finished.

20. The apparatus of claim 19, wherein the processor is configured to:
set a lateral position of the host vehicle at a time point that an opposition-directional steering is terminated, as the target position of the host vehicle,
when the opposition-direction steering is performed after the steering is performed.

21. A vehicle system comprising:
a vehicle driving controller to adjust a driving assistance controlling setting value, based on whether a user looks ahead, whether the user performs a driving manipulation, and a driving condition during driving assistance of a vehicle; and
a sensing module to sense whether the user looks ahead and the driving condition and to provide a sensing result to the vehicle driving controller,
wherein the vehicle driving controller is configured to:
determine whether a preceding vehicle is present, when the user looks ahead for a preset time and presses a deceleration pedal, and
decrease a target speed of a host vehicle, when the preceding vehicle is absent.

22. A method for controlling driving assistance for a vehicle, the method comprising:
determining whether a user looks ahead, whether the user performs a driving manipulation, and a driving condition during driving assistance of the vehicle; and
adjusting a driving assistance controlling setting value, based on the determination of whether the user looks ahead, whether the user performs the driving manipulation, and the driving condition,
wherein adjusting the driving assistance controlling setting value includes:
determining whether a preceding vehicle is present, when the user looks ahead for a preset time and presses a deceleration pedal, and
decreasing a target speed of a host vehicle, when the preceding vehicle is absent.

23. The method of claim 22, wherein the driving manipulation includes:
at least one of whether an acceleration pedal is manipulated, whether a deceleration pedal is manipulated, whether a lane is changed, and whether steering is performed; and
wherein the driving condition includes:
at least one of whether a preceding vehicle is present, a difference in a target speed between the preceding vehicle and a host vehicle, and whether a surrounding vehicle is present.

* * * * *